United States Patent
Ishizawa et al.

(10) Patent No.: US 12,332,860 B2
(45) Date of Patent: Jun. 17, 2025

(54) INFORMATION PROCESSING SYSTEM, INFORMATION PROCESSING METHOD AND STORAGE MEDIUM

(71) Applicant: NEC Corporation, Tokyo (JP)

(72) Inventors: Yoshio Ishizawa, Tokyo (JP); Satoshi Nakazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/232,746

(22) Filed: Aug. 10, 2023

(65) Prior Publication Data

US 2023/0385255 A1 Nov. 30, 2023

Related U.S. Application Data

(63) Continuation of application No. 18/197,972, filed on May 16, 2023, now Pat. No. 12,066,994, which is a
(Continued)

(30) Foreign Application Priority Data

Apr. 23, 2013 (JP) ................................. 2013-090536

(51) Int. Cl.
*G06F 16/22* (2019.01)
*G06F 40/247* (2020.01)
(Continued)

(52) U.S. Cl.
CPC ............ *G06F 16/22* (2019.01); *G06F 40/247* (2020.01); *G06F 40/30* (2020.01); *G06Q 10/06* (2013.01); *G06V 20/52* (2022.01)

(58) Field of Classification Search
CPC ........ G06F 16/22; G06F 40/247; G06F 40/30; G06Q 10/06; G06V 20/52
See application file for complete search history.

(56) References Cited

U.S. PATENT DOCUMENTS

| 4,589,081 A | 5/1986 | Massa et al. |
| 5,936,522 A * | 8/1999 | Vogt ........................ G08B 13/08 |
| | | 340/556 |

(Continued)

FOREIGN PATENT DOCUMENTS

| JP | 2004-178258 A | 6/2004 |
| JP | 2009-539182 A | 11/2009 |

(Continued)

OTHER PUBLICATIONS

International Search Report for PCT Application No. PCT/JP2014/002131, mailed on Jun. 3, 2014.
(Continued)

*Primary Examiner* — Abiy Getachew

(57) ABSTRACT

Setting or verification of a monitoring rule in response to a monitoring target environment is supported. An information processing system includes a situation information receiving unit that receives an input of situation information indicating a situation in a monitoring target environment. The information processing system further includes a normal situation storage unit. The normal situation storage unit stores environment information indicating the monitoring target environment in association with a set of situation information indicating a situation that is not abnormal in the monitoring target environment. The information processing system further includes a retrieval unit. The retrieval unit refers to the normal situation storage unit upon receiving the input of the situation information indicating the information in the monitoring target environment. The retrieval unit then retrieves the environment information associated with the set of the situation information that does not include the input situation information.

18 Claims, 10 Drawing Sheets

Related U.S. Application Data continuation of application No. 17/241,185, filed on Apr. 27, 2021, now Pat. No. 11,693,838, which is a continuation of application No. 16/711,584, filed on Dec. 12, 2019, now Pat. No. 11,023,436, which is a continuation of application No. 16/266,281, filed on Feb. 4, 2019, now Pat. No. 10,552,395, which is a continuation of application No. 14/782,428, filed as application No. PCT/JP2014/002131 on Apr. 15, 2014, now Pat. No. 10,346,377.

(51) Int. Cl.
*G06F 40/30* (2020.01)
*G06Q 10/06* (2023.01)
*G06V 20/52* (2022.01)

(56) References Cited

U.S. PATENT DOCUMENTS

| | | | |
|---|---|---|---|
| 7,595,815 B2 | 9/2009 | Donovan et al. | |
| 2001/0008561 A1* | 7/2001 | Paul | G06F 3/017 |
| | | | 382/165 |
| 2002/0028003 A1* | 3/2002 | Krebs | G06V 40/25 |
| | | | 382/209 |
| 2002/0073364 A1 | 6/2002 | Katagiri et al. | |
| 2005/0282519 A1 | 12/2005 | Kobayashi | G06Q 30/06 |
| | | | 455/408 |
| 2006/0010504 A1* | 1/2006 | Sharma | H04M 11/045 |
| | | | 726/35 |
| 2006/0018516 A1* | 1/2006 | Masoud | G06T 7/254 |
| | | | 382/115 |
| 2006/0055534 A1* | 3/2006 | Fergusson | G08B 13/26 |
| | | | 340/562 |
| 2008/0071717 A1 | 3/2008 | Nisani et al. | |
| 2008/0193010 A1 | 8/2008 | Eaton et al. | |
| 2008/0243394 A1 | 10/2008 | Petricoin et al. | |
| 2010/0125683 A1 | 5/2010 | Soeda | G06F 11/3466 |
| | | | 710/19 |
| 2012/0210429 A1 | 8/2012 | Stute | |
| 2016/0321506 A1* | 11/2016 | Fridental | H04N 7/181 |

FOREIGN PATENT DOCUMENTS

| | | |
|---|---|---|
| JP | 2013-003929 A | 1/2013 |
| JP | 2013-003930 A | 1/2013 |

OTHER PUBLICATIONS

English translation of Written opinion for PCT Application No. PCT/JP2014/002131, mailed on Jun. 3, 2014.
Hiromi Okamoto, et al., "Situation-based behavior modeling for anomality detection", The Institute of Electronics, Information and Communication Engineers, Technical Report, vol. 108, No. 94, Jun. 12, 2008, pp. 103-108. English Abstract. Cited in ISR.
Singapore Office Action for SG Application No. 11201508696Q dated on May 24, 2016.
Communication dated Mar. 27, 2018 from the Japanese Patent Office in counterpart application No. 2015-513526.
Communication dated Mar. 18, 2019 from The United States Patent and Trademark Office in counterpart U.S. Appl. No. 14/782,428.

\* cited by examiner

Fig. 2

| ENVIRONMENT INFORMATION | SITUATION INFORMATION |
|---|---|
| SOCCER STADIUM | A PERSON IS SCREAMING LOUDLY |
| | A PERSON IS JUMPING |
| | A PERSON IS CHEERING |
| | ... |
| LIVE CONCERT | A PERSON IS SCREAMING LOUDLY |
| | A PERSON IS JUMPING |
| | A PERSON IS SINGING |
| | ... |
| AIRPORT | A PERSON IS TAKING A PHOTOGRAPH |
| | A PERSON IS GIVING SOMEBODY A SEND-OFF |
| | A PERSON IS BOARDING AN AIRPLANE |
| | ... |
| KITCHEN | A PERSON IS HOLDING SOMETHING LIKE A KNIFE |
| | ... |

INFORMATION PROCESSING SYSTEM, INFORMATION PROCESSING METHOD AND STORAGE MEDIUM

The present application is a Continuation Application of U.S. patent application Ser. No. 18/197,972 filed on May 16, 2023, which is a Continuation Application of U.S. patent application Ser. No. 17/241,185 filed on Apr. 27, 2021, which issued as U.S. Pat. No. 11,693,838, which is a Continuation Application of U.S. patent application Ser. No. 16/711,584 filed on Dec. 12, 2019, which issued as U.S. Pat. No. 11,023,436, which is a Continuation Application of U.S. patent application Ser. No. 16/266,281 filed on Feb. 4, 2019, which issued as U.S. Pat. No. 10,552,395, which is a Continuation Application of U.S. patent application Ser. No. 14/782,428 filed on Oct. 5, 2015, which issued as U.S. Pat. No. 10,346,377, which is a National Stage Entry of international application PCT/JP2014/002131, filed on Apr. 15, 2014, which claims the benefit of priority from Japanese Patent Application 2013-090536 filed on Apr. 23, 2013, the disclosures of all of which are incorporated herein, in their entirety, by this reference.

TECHNICAL FIELD

The present invention relates to an information processing system and the like.

BACKGROUND ART

Monitoring system is a system intended to improve security at a station, an airport, or the like. The monitoring system is configured to include a sensor such as a camera and a microphone. The monitoring system monitors occurrence of an abnormal condition by using a sensor output and a monitoring rule. The monitoring rule is a conditional expression representing what value of the sensor output causes a determination of occurrence of an abnormal condition.

For example, the monitoring rule is a conditional expression such as "if a camera takes an image of a person putting down luggage, nobody comes close to the luggage for a predetermined time, then issue a warning". When the conditional clause of this monitoring rule is satisfied, it can be interpreted that an abnormal condition of "luggage abandonment" is occurring, for example.

PTL 1 discloses a monitoring system that monitors occurrence of an abnormal condition by using a sensor output and a monitoring rule. PTL 1 discloses that occurrence of an abnormal condition is detected at a plurality of different places. PTL 1 discloses that monitoring rules to be set are different between a case of monitoring a store which manages merchandise by a Point Of Sale system (POS) and a case of monitoring a store which manages merchandise by a Radio Frequency IDentification (RFID) tag.

PTL 2 discloses a technique of automatically generating a monitoring rule based on a database in which data concerning abnormal events are registered and a database in which data concerning normal events are registered.

CITATION LIST

Patent Literature

[PTL 1] Japanese Translation of PCT International Application Publication No. 2009-539182

[PTL 2] Japanese Laid-open Patent Publication No. 2013-003929

SUMMARY OF INVENTION

Technical Problem

PTL 1 discloses that different monitoring rules are set in response to a place to be monitored (hereafter, referred to as "monitoring target place"). According to the technique disclosed in PTL 1, without special knowledge on the monitoring target place, an operator of the monitoring system is unable to set an appropriate monitoring rule. According to the technique disclosed in PTL 2, a monitoring rule in response to an environment to be monitored (hereafter, referred to as "monitoring target environment") cannot be generated.

One of the objectives of the present invention is to support setting or verification of a monitoring rule in response to a monitoring target environment.

Solution to Problem

A first aspect of the present invention is an information processing system including: a situation information receiving unit which receives an input of situation information indicating a situation in a monitoring target environment; a normal situation storage unit which stores environment information indicating the monitoring target environment in association with a set of situation information indicating a situation that is not abnormal in the monitoring target environment; and a retrieval unit which, in response to receiving the input of the situation information indicating the information in the monitoring target environment, refers to the normal situation storage unit and retrieves the environment information associated with the set of the situation information that does not include the input situation information.

A second aspect of the present invention is an information processing method which is: performed by a computer that can access a normal situation storage unit which stores environment information indicating a monitoring target environment in association with a set of situation information indicating a situation that is not abnormal in the monitoring target information, the set of the situation information being selected out of pieces of situation information indicating a situation in the monitoring target environment. The method includes: receiving an input of the situation information indicating a situation in the monitoring target information; and in response to receiving the input of the situation information, referring to the normal situation storage unit and retrieving environment information associated with a set of the situation information that does not include the input situation information.

A third aspect of the present invention is a program that causes a computer that can access a normal situation storage unit which stores environment information indicating a monitoring target environment in association with a set of situation information indicating a situation that is not abnormal in the monitoring target information, the set of the situation information being selected out of pieces of situation information indicating a situation in the monitoring target environment, to execute: a process of receiving an input of the situation information indicating a situation in the monitoring target information; and a process of, in response to receiving the input of the situation information, referring to the normal situation storage unit and retrieving environment information associated with a set of the situation information that does not include the input situation information.

Further, the objective of the present invention is achieved by a computer readable storage medium in which the program described above is stored.

Advantageous Effects of Invention

The present invention can support setting or verification of a monitoring rule in response to a monitoring target environment.

BRIEF DESCRIPTION OF DRAWINGS

FIG. 2 is an example of information stored by a normal situation storage unit 210 according to the first exemplary embodiment of the present invention;

DESCRIPTION OF EMBODIMENTS

Figure 1:
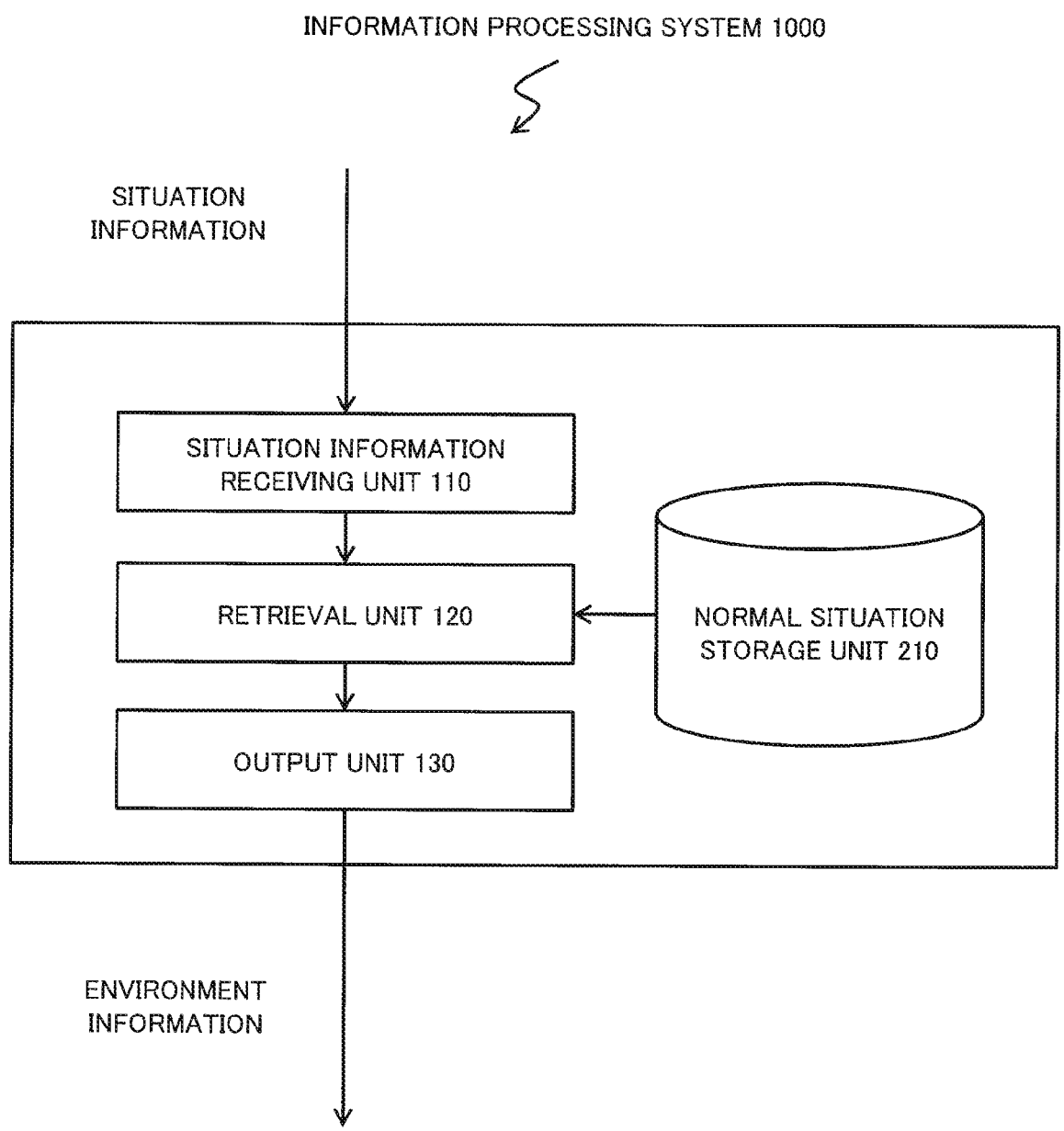
FIG. 1 is a block diagram illustrating a configuration of an information processing system 1000 according to a first exemplary embodiment of the present invention.

In order to facilitate the understanding of the invention, the problem to be solved by the present invention will be described in details.

Monitoring systems can monitor various environments. For example, monitoring systems can monitor various places such as "stadium", "airport", or "kitchen". When monitoring a stadium, a monitoring system can monitor various events such as "soccer game" or "rock live concert". When monitoring the stadium where a soccer game is held, for example, the monitoring system can perform monitoring in various time slots such as "morning", "before the game", "during the game", "after the game", or "night".

In the followings, "place", "event", "time slot", and the like are collectively described as "environment to be monitored" or "monitoring target environment". Further, information indicating the monitoring target environment is described as "environment information".

In order for the monitoring system to perform appropriate monitoring, an operator of the monitoring system is required to set a monitoring rule in response to a monitoring target environment. When the monitoring target environment is a piano concert, for example, it is appropriate to set a monitoring rule such as "if a person screams loudly, then issue an alarm". The situation where a person screams loudly at a piano concert is an abnormal situation. When a conditional expression of this monitoring rule is satisfied at a piano concert, it can be interpreted that some abnormal condition is occurring. However, when the monitoring target environment is a rock live concert, it is not appropriate to set the monitoring rule as described above. A situation where a person screams loudly at the rock live concert is not at all the abnormal situation. However, in the monitoring system in which this monitoring rule is set, an alarm is issued for such a usual situation that a person screams loudly.

In order to set an appropriate monitoring rule in response to a monitoring target environment, the operator of the monitoring system is required to have special knowledge of the monitoring target environment. When the operator without the special knowledge sets a monitoring rule, an inappropriate monitoring rule is likely to be set by which the usual situation for the monitoring target environment can be determined as an abnormal condition.

Further, setting different monitoring rules for every monitoring target environment is a complicated operation for the operator of the monitoring system. One of the devices for reducing man-hour in setting the monitoring rule is an expansion of a monitoring rule. The expansion of a monitoring rule is to divert a conditional clause of the monitoring rule set for monitoring a certain environment to a conditional clause of the monitoring rule for monitoring another environment. However, when the operator of the monitoring system expands the monitoring rule without paying a special attention, an environment where an inappropriate monitoring rule may be set are likely to occur.

First Exemplary Embodiment

FIG. 1 is a block diagram illustrating a configuration of an information processing system 1000 according to a first exemplary embodiment. As illustrated in FIG. 1, the information processing system 1000 according to the first exemplary embodiment includes a situation information receiving unit 110, a normal situation storage unit 210, a retrieval unit 120, and an output unit 130. The information processing system 1000 is operated by an operator of a monitoring system, for example.

The situation information receiving unit 110 receives an input of situation information. The situation information is information indicating a situation in a monitoring target environment. For example, the situation information is information indicating an action by a person and the like in the monitoring target environment. The situation information may be information indicating a motion of a bicycle, a motorcycle, a car, and the like driven by a person in the monitoring target environment, for example. The situation information may be information indicating a number of people per unit area in the monitoring target environment, for example. The situation information may be represented by a co-occurrence expression such as "a person is holding something like a knife, and a person is shouting", for example.

The normal situation storage unit 210 stores environment information indicating the environment in association with a set of situation information indicating situations that are not abnormal in the monitoring target environment.

FIG. 2 is a diagram illustrating an example of information stored by the normal situation storage unit 210. As illustrated in FIG. 2, the normal situation storage unit 210 stores environment information such as "soccer stadium" in association with a set of situation information such as "a person is screaming loudly", "a person is jumping", and "a person is cheering". At a soccer stadium, the situations such as "a person is screaming loudly", "a person is jumping", and "a person is cheering" are the usual situations but not at all abnormal situations.

In this way, the normal situation storage unit 210 stores the information in which the set of the situation information ("a person is screaming loudly", "a person is jumping", and "a person is cheering") indicating situations that are not abnormal in the monitoring target environment (soccer stadium) is associated with the environment information (soccer stadium) indicating the environment.

Going back to FIG. 1, the retrieval unit 120 refers to the normal situation storage unit 210 to retrieve environment information associated with a set of situation information that does not include the situation information received by the situation information receiving unit 110.

For example, the situation information receiving unit 110 receives situation information such as "a person is holding something like a knife". The retrieval unit 120 refers to the normal situation storage unit 210 illustrated in FIG. 2 to retrieve environment information such as "soccer stadium", "live concert", and "airport" that are associated with a set of situation information which does not include the situation information such as "a person is holding something like a knife".

For example, the situation information receiving unit 110 receives an input of situation information expressed in a co-occurrence expression such as "a person is shouting, and a person is jumping". The retrieval unit 120 refers to the normal situation storage unit 210 illustrated in FIG. 2 to retrieve environment information that is associated with a set of situation information which includes neither the situation information such as "a person is shouting" nor the situation information such as "a person is jumping". That is, the retrieval unit 120 retrieves the environment information such as "airport" and "kitchen".

The output unit 130 outputs a list of the retrieved environment information.

Figure 3:
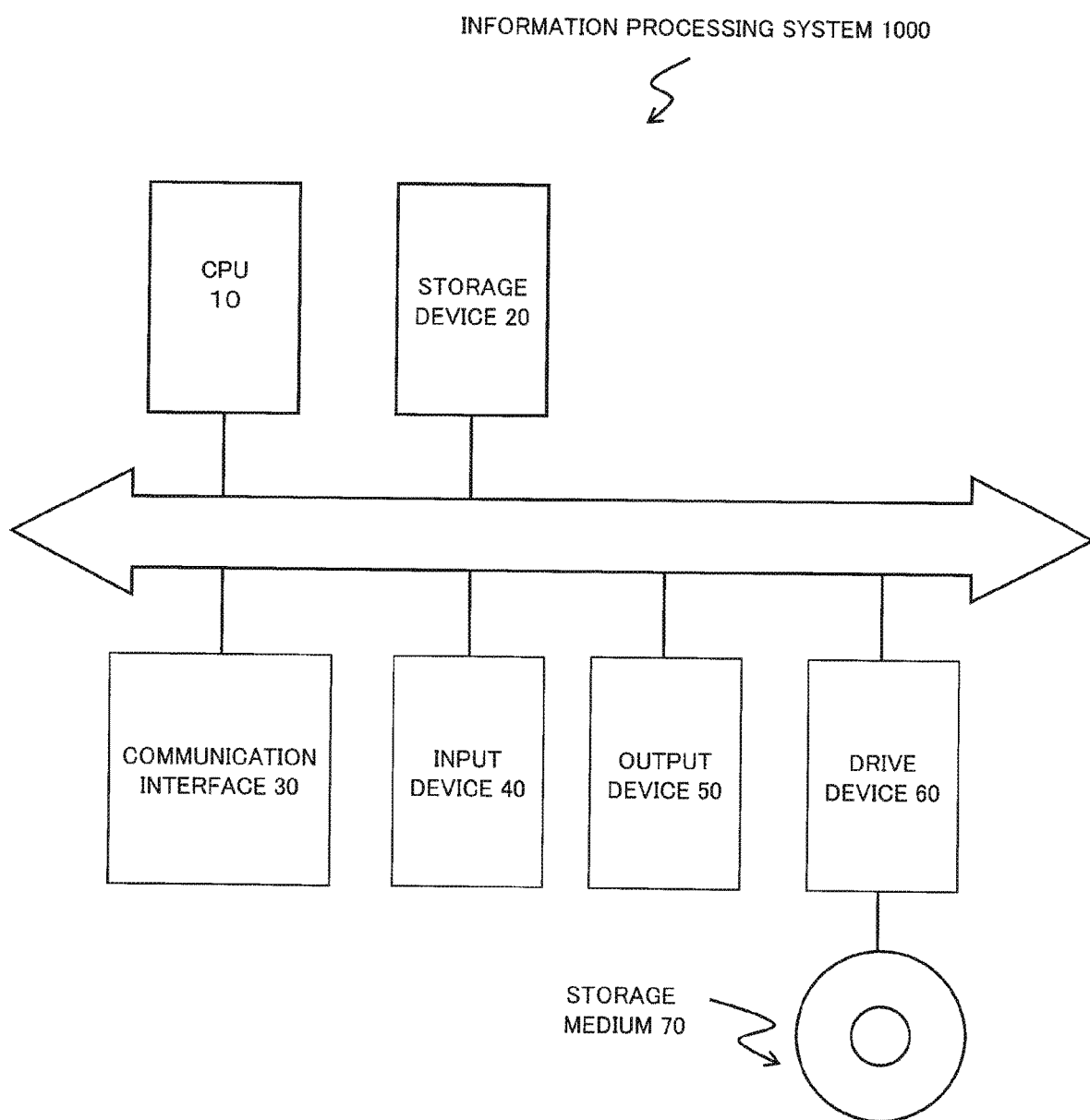
FIG. 3 is a diagram illustrating an example of a hardware configuration that can realize the information processing system 1000 of the present invention.

FIG. 3 is a diagram of a hardware configuration of the information processing system 1000 illustrated in FIG. 1. As illustrated in FIG. 3, the information processing system 1000 includes a Central Processing Unit (CPU) 10, a storage device 20, and a communication interface 30. The information processing system 1000 may include an input device 40 and an output device 50.

Functions of the information processing system 1000 are realized by the CPU 10 that executes a program read to the storage device 20, for example. The communication performed by the information processing system 1000 is realized by an application program that controls the communication interface 30 by using a function provided by an Operating System (OS), for example. The input device 40 is a keyboard, a mouse, or a touch panel, for example. The output device 50 is a display, for example.

Note that the present invention exemplified by this exemplary embodiment and subsequent respective exemplary embodiments may be configured by a non-volatile storage medium 70 such as a compact disc and the like in which the program described above is stored. The program stored in the storage medium 70 is read by a drive device 60, for example.

The information processing system 1000 may be configured such that two or more physically separated devices are connected by wire or wirelessly.

Figure 4:
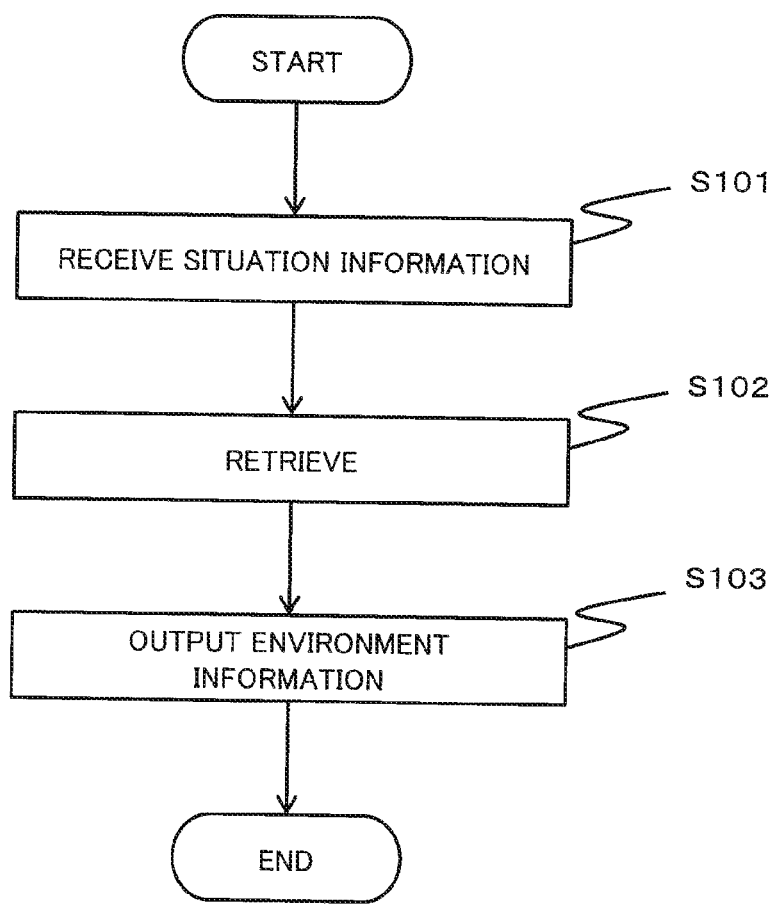
FIG. 4 is a flowchart illustrating an operation of the information processing system 1000 according to the first exemplary embodiment of the present invention.

Next, an operation of the information processing system 1000 illustrated in FIG. 1 will be described by using FIG. 4. FIG. 4 is a flowchart illustrating an example of the operation of the information processing system 1000.

The situation information receiving unit 110 receives an input of situation information (S101). The retrieval unit 120 refers to the normal situation storage unit 210 and retrieves the environment information associated with the set of the situation information that does not include the situation information of which input is received (S102). The output unit 130 outputs the environment information retrieved by the retrieval unit 120 (S103).

The effect taken by the information processing system 1000 according to the first exemplary embodiment will be described.

By confirming the information output by the output unit 130, the operator is able to recognize that the situation information received by the situation information receiving unit 110 is appropriate as the information to be described in a conditional clause of a monitoring rule for monitoring the environment indicated by the environment information output by the output unit 130. For example, the operator is able to recognize that the situation information such as "a person is holding something like a knife" is appropriate for the information to be described in the conditional clause of the monitoring rule for monitoring "soccer stadium", "live concert", and "airport".

It is assumed that the monitoring rule is expanded in order to reduce man-hour of the operator in setting the monitoring rule for a plurality of environments. The information processing system 1000 according to the first exemplary embodiment is able to output a list of the monitoring target environments that can be expanded for the situation information of which input is received. Therefore, when expanding the monitoring rule, the operator is not required to confirm, one by one, whether or not the monitoring rule is expandable. This allows for a reduction of man-hour of the operator in setting the monitoring rule to a plurality of environments to be monitored.

As described above, the information processing system 1000 according to the first exemplary embodiment can support the operator to set a monitoring rule in response to a monitoring target environment.

Note that the output unit 130 may output information in which the retrieved environment information is associated with the situation information of which input is received. Further, the output unit 130 may additionally output information indicating that the situation indicated by the situation information of which input is received is the abnormal situation in the environment indicated by the output environment information. Such a configuration allows the information processing system 1000 to indicate more comprehensible information to the operator. That is, the information processing system 1000 can indicate more directly to the operator that the environmental information output by the situation information of which input is received is appropriate for the information to be described in the conditional clause of the monitoring rule.

Note that the information to be stored by the normal situation storage unit 210 may be generated manually or may be generated by the information processing system 1000. When manually generating the information to be stored in the normal situation storage unit 210, the operator generates information in which usual actions or expressions under usual situations at a place or an event to be monitored are associated with the place or the event. It is assumed that the information processing system 1000 generates the information stored in the normal situation storage unit 210. In this case, the information processing system 1000 may generate the information to be stored in the normal situation storage unit 210 by extracting the situation information from texts such as blogs written about the place or the event to be monitored. This is because illegal acts, manner breach acts, and the like are less likely to be written in blogs and the like.

When the information processing system 1000 arranges the information stored in the normal situation storage unit 210, a technique for extracting a compound word of high appearance frequency may be utilized, as disclosed in Reference 1, for example.

REFERENCE 1

"Synonym Extraction Using Web Search Query and Click-through Logs" by Kei Uchiumi and Mamoru Komachi, Transactions of Information Processing Society of Japan, Database, Vol. 6 (No. 1), Pages 16-28, Published on Jan. 23, 2013

The information processing system 1000 according to the first exemplary embodiment outputs a list of the environments to be monitored that can be expanded relative to the situation information of which input is received. However, the information processing system 1000 may output a list of the environments to be monitored which cannot be expanded relative to the situation information of which input is received.

Note that the environment information is not limited to the information indicating a place, an event, a time slot, or the like. For example, information such as "environment with little traffic", "environment whose temperature is 25 degrees centigrade or higher and humidity is 80% or higher", and so on can be the environment information. The environment information may include actions by a person. For example, information such as "in the environment with a women having a bag", "in the environment where a silver car stops", "when a child is checking the left and right", and so on can be the environment information.

The situation information may be an action taken by a person in the environment to be monitored. In this case, the situation information can be rephrased by action information. The situation information receiving unit 110 receives an input of action information indicating an action by a person taken in the monitoring target environment. The normal situation storage unit 210 stores the environment information indicating the environment in association with a set of action information indicating actions that are not abnormal in the monitoring target environment. The retrieval unit 120 refers to the normal situation storage unit 210 and retrieves the environment information associated with the set of the action information that does not include the action information of which input is received.

Second Exemplary Embodiment

Figure 5:
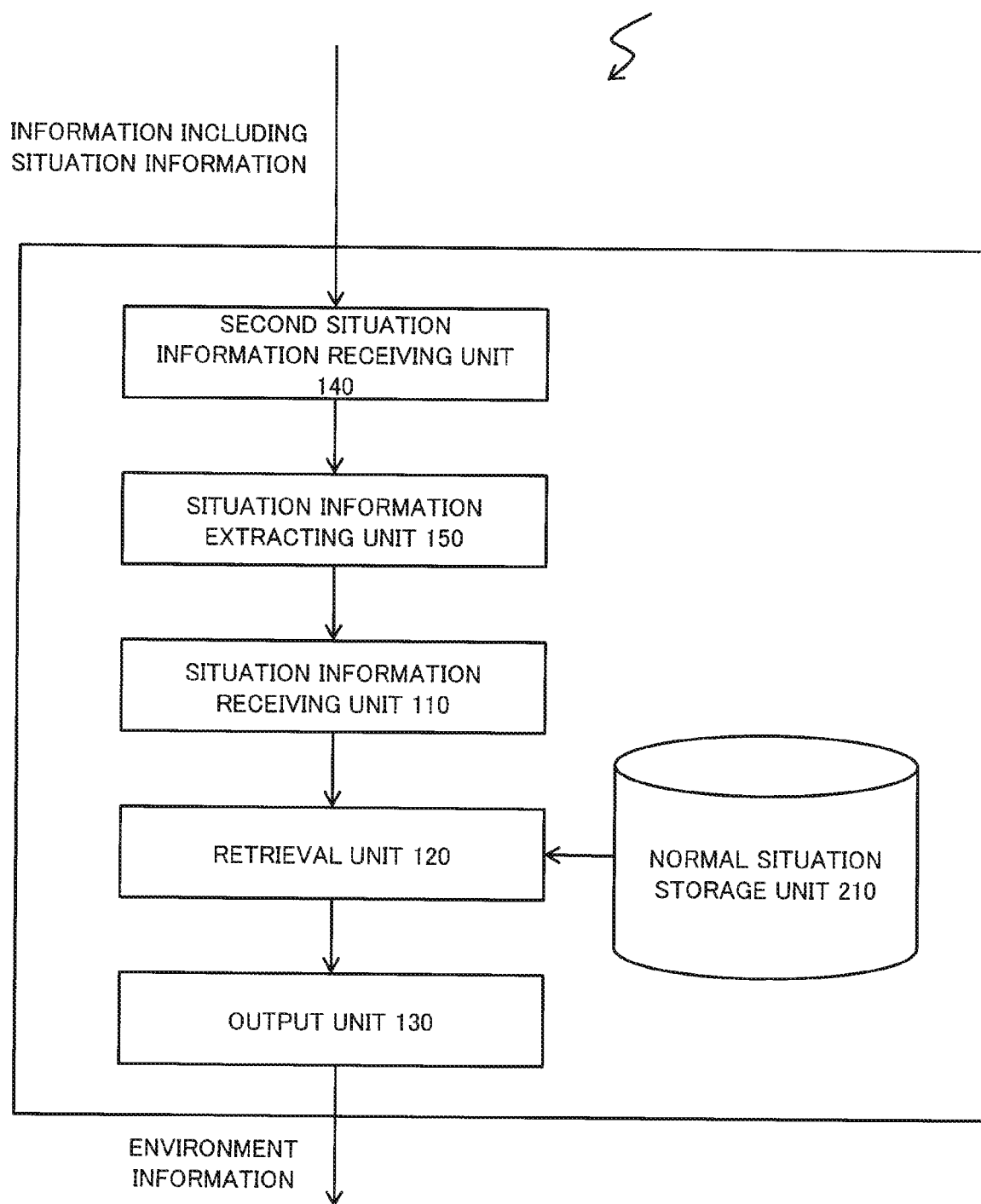
FIG. 5 is a block diagram illustrating a configuration of an information processing system 1000 according to a second exemplary embodiment of the present invention.

FIG. 5 is a block diagram illustrating a configuration of an information processing system 2000 according to a second exemplary embodiment. The same reference numerals are provided to substantially the same components as those illustrated in FIG. 1. As illustrated in FIG. 5, the information processing system 2000 according to the second exemplary embodiment includes a second situation information receiving unit 140 and a situation information extracting unit 150 in addition to the information processing system 1000 according to the first exemplary embodiment.

The second situation information receiving unit 140 receives an input of information including situation information. The information including the situation information may be text data representing natural sentence, or may be image data, audio data, or video data, for example.

The situation information extracting unit 150 extracts the situation information from the information including the situation information. For example, it is assumed that the second situation information receiving unit 140 receives an input of the following text. "A fifth grade boy student of this school found an adult holding something like a knife and shouting in a strange voice within 70 to 80 m behind him on the way home after playing at a park. Because he thought he might be attacked, he rushed home by bicycle and reported it." The situation information extracting unit 150 extracts the expressions representing the situation of the monitoring target environment such as "an adult is holding something like a knife" and "an adult is shouting in a strange voice" from the above text. The situation information extracting unit 150 may extract a co-occurrence expression such as "an adult is holding something like a knife, and the adult is shouting in a strange voice". The situation information extracting unit 150 may extract a human action in the monitoring target environment preferentially, for example.

The situation information extracting unit 150 may determine the entity of the action to utilize it for the extraction by using a method disclosed in Reference 2, for example.

REFERENCE 2

"Morpheme, Construction, and Case Analysis Using JUMAN/KNP", by Daisuke Kawahara, Sadao Kurohashi, Academic Center for Computing and Media Studies, Kyoto University, Media Information Processing Specialized Course, "Natural Language Processing Technique", held on Sep. 8 to Sep. 10, 2008

Figure 6:
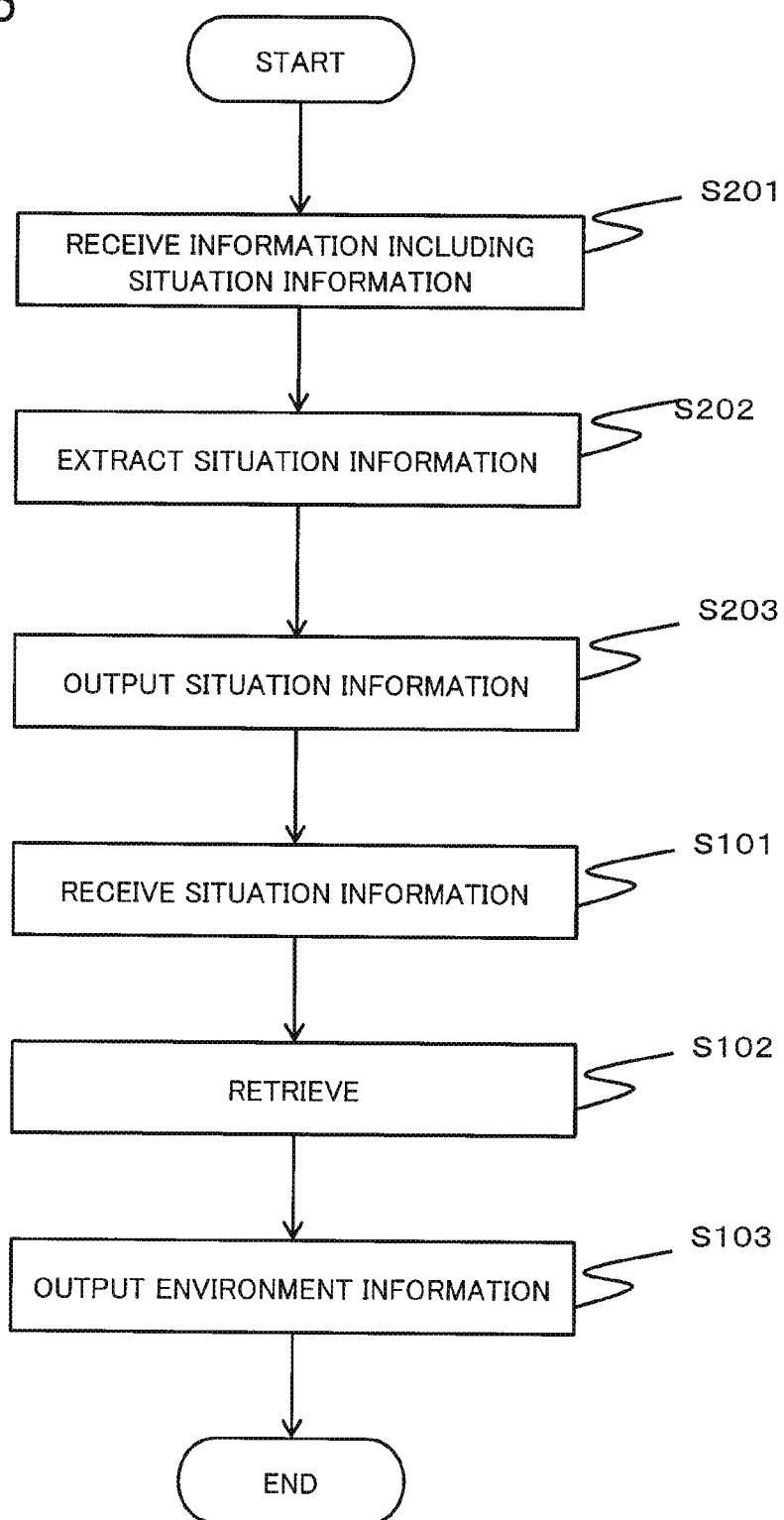
FIG. 6 is a flowchart illustrating an operation of the information processing system 1000 according to the second exemplary embodiment of the present invention.

Next, an operation of the information processing system 2000 illustrated in FIG. 5 will be described by using FIG. 6. FIG. 6 is a flowchart illustrating the operation of the information processing system 2000. The same reference numerals are provided to substantially the same operations as those illustrated in the flowchart of FIG. 4.

The second situation information receiving unit 140 receives an input of information including situation information (S201). The situation information extracting unit 150 extracts the situation information from the information including the situation information (S202). The situation information extracting unit 150 outputs the extracted situation information to the situation information receiving unit 110 (S203). Since the subsequent operations are the same as those by the information processing system 1000 according to the first exemplary embodiment, description thereof will be omitted.

The information processing system 2000 according to the second exemplary embodiment can support setting of a monitoring rule in response to a monitoring target environment.

Third Exemplary Embodiment

Figure 7:
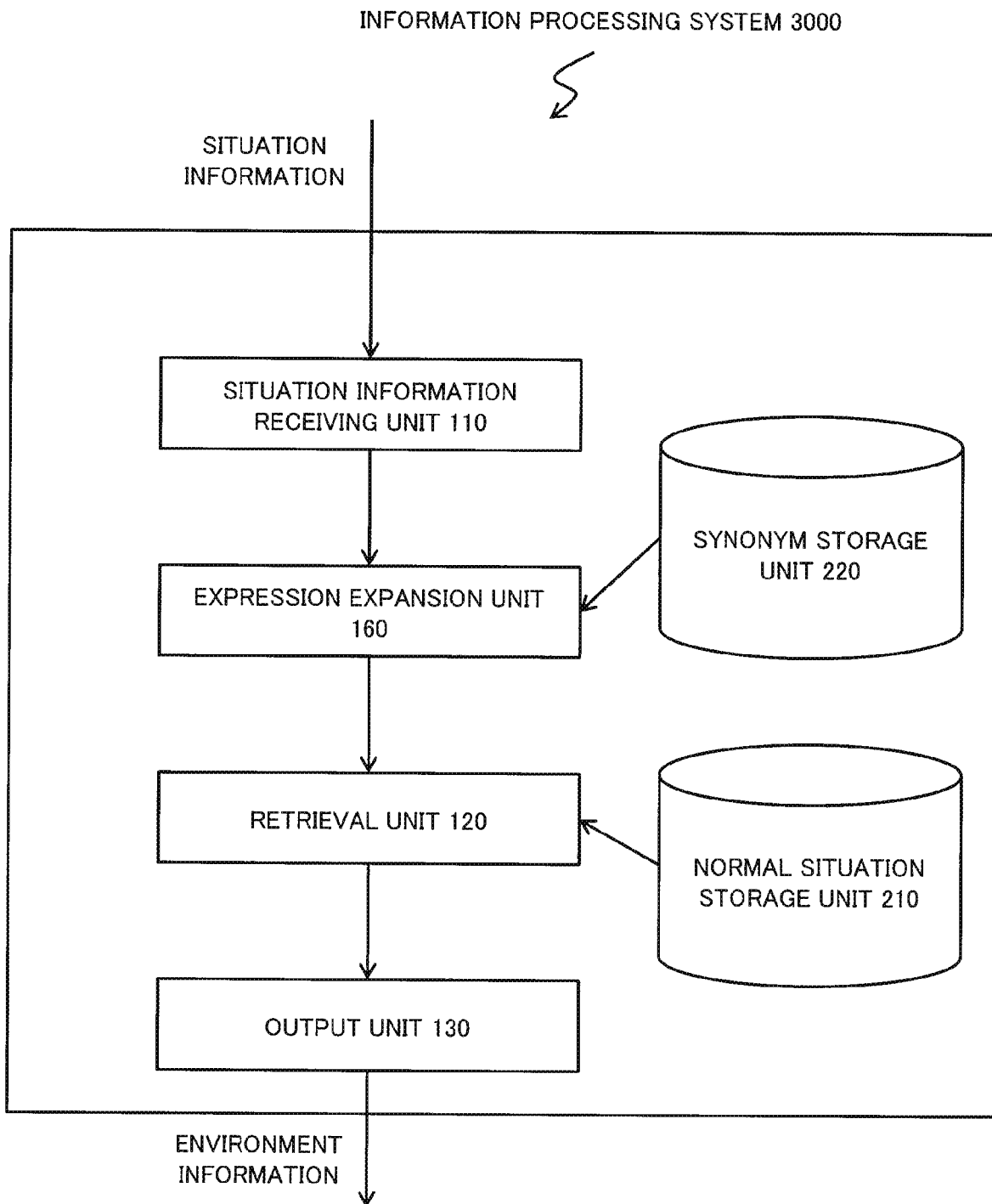
FIG. 7 is a block diagram illustrating a configuration of an information processing system 1000 according to a third exemplary embodiment of the present invention.

FIG. 7 is a block diagram illustrating a configuration of an information processing system 3000 according to a third exemplary embodiment. The same reference numerals are provided to substantially the same components as those illustrated in FIG. 1. As illustrated in FIG. 7, the information processing system 3000 according to the third exemplary embodiment includes an expression expansion unit 160 and a synonym storage unit 220 in addition to the information processing system 1000 according to the first exemplary embodiment.

In the synonym storage unit 220, different situation information indicating the same or a similar situation is associated and stored for respective situation information. For example, situation information such as "a person is shouting loudly", "a person is shrieking", and "a crowd is screaming loudly" is associated with the situation information such as "a person is shouting loudly" and stored.

The expression expansion unit 160 extracts, from the synonym storage unit 220, a synonym(s) for the situation information received by a situation information receiving unit 110.

Figure 8:
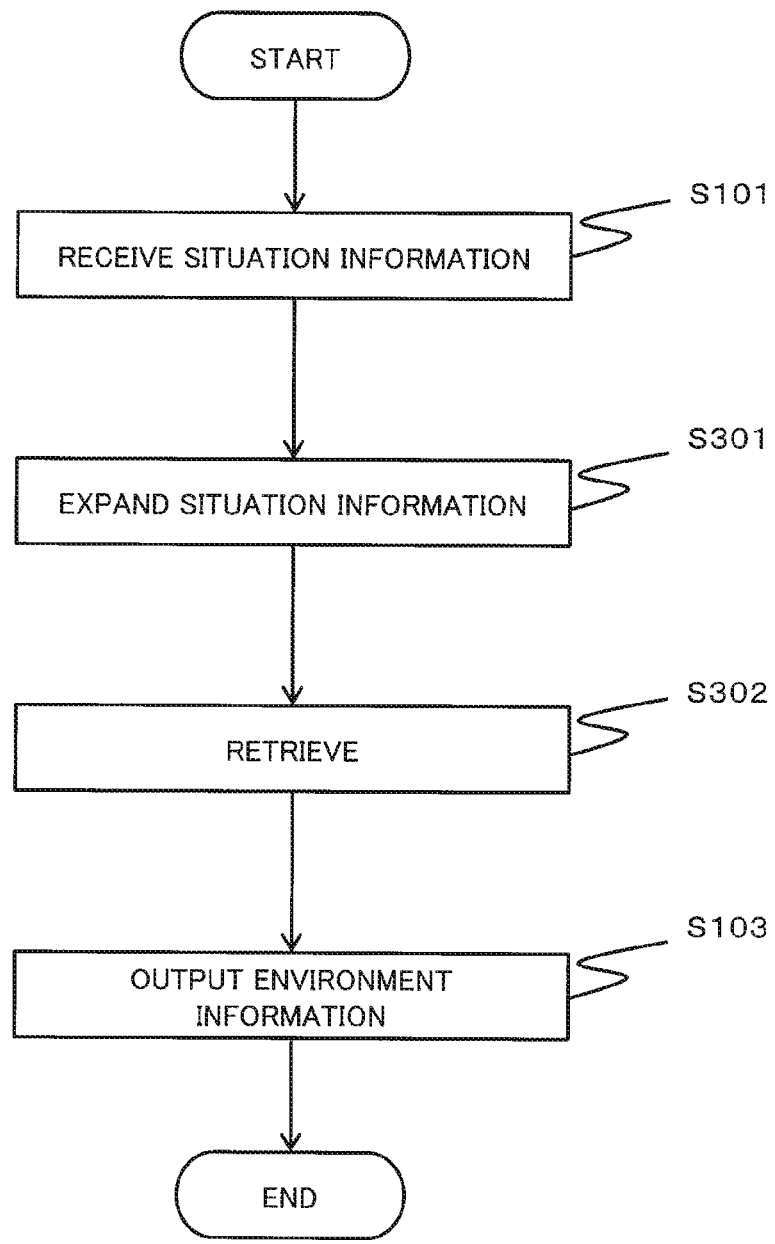
FIG. 8 is a flowchart illustrating an operation of the information processing system 1000 according to the third exemplary embodiment of the present invention.

Next, an operation of the information processing system 3000 illustrated in FIG. 7 will be described by using FIG. 8. FIG. 8 is a flowchart illustrating the operation of the information processing system 3000. The same reference numerals are provided to substantially the same operations as those illustrated in the flowchart of FIG. 4.

The situation information receiving unit 110 receives an input of situation information (S101). The expression expansion unit 160 extracts, from the synonym storage unit 220, a synonym(s) for the situation information received by the situation information receiving unit 110 (S301). The retrieval unit 120 retrieves environment information associated with a set of situation information that includes neither the situation information received by the situation information receiving unit 110 nor the synonym extracted by the expression expansion unit 160 (S302). The output unit 130 outputs the environment information retrieved by the retrieval unit 120 (S103).

The information processing system 3000 according to the third exemplary embodiment can utilize the synonym extracted by the expression expansion unit 160 in addition to the situation information received by the situation information receiving unit 110. Therefore, setting of a monitoring rule in response to a monitoring target environment can be supported with higher accuracy.

Fourth Exemplary Embodiment

Figure 9:
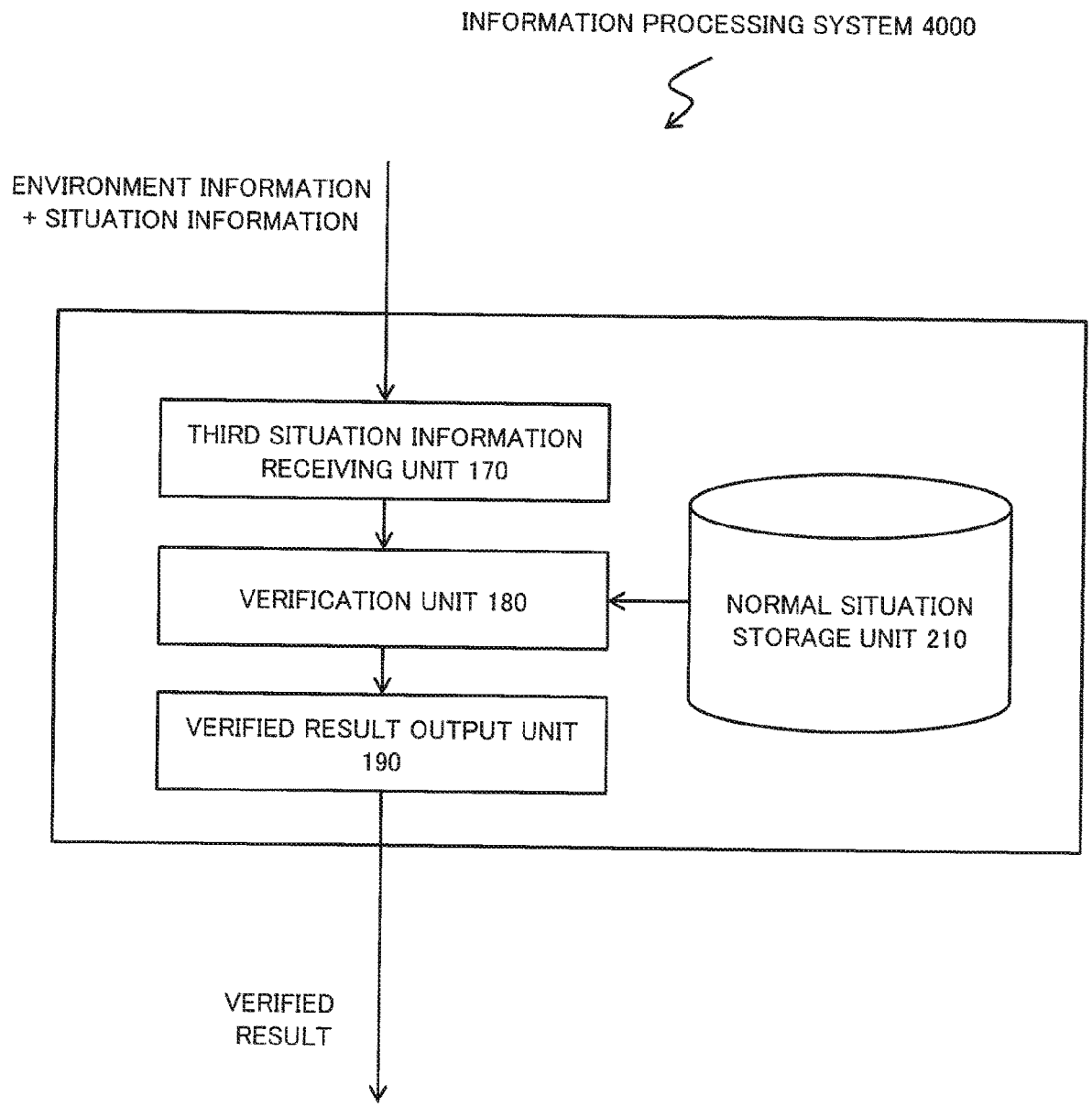
FIG. 9 is a block diagram illustrating a configuration of an information processing system 1000 according to a fourth exemplary embodiment of the present invention.

FIG. 9 is a block diagram illustrating a configuration of an information processing system 4000 according to a fourth exemplary embodiment. As illustrated in FIG. 9, the information processing system 4000 according to the fourth exemplary embodiment includes a third situation information receiving unit 170, a verification unit 180, and a verified result output unit 190.

The third situation information receiving unit 170 receives an input of information in which situation information is associated with environment information. The operator inputs the information in which situation information is associated with environment information. The situation information is intended to be described as a conditional clause of a monitoring rule for monitoring an environment indicated by that environment information.

For example, it is assumed that the operator considers describing the situation information such as "a person is screaming loudly" or "a person is holding something like a knife" as a conditional clause of a monitoring rule for monitoring a kitchen. In this case, the operator inputs, to the third situation information receiving unit 170, information in which the environment information as "kitchen" is associated with the situation information as "a person is screaming loudly" (hereafter referred to as first information). Further, the operator inputs, to the third situation information receiving unit 170, information in which the environment information as "kitchen" is associated with the situation information as "a person is holding something like a knife" (hereafter referred to as second information).

The verification unit 180 refers to a normal situation storage unit 210 and compares a set of the situation information associated with the environment information included in the information of which input is received with the situation information included in the information of which input is received. The verification unit 180 then verifies whether or not there is matched situation information.

In the example of the first information described above, the verification unit 180 refers to the normal situation storage unit 210 illustrated in FIG. 2. The verification unit 180 compares the set of the situation information (a person is holding something like a knife) associated with the environment information (kitchen) included in the first information with the situation information (a person is screaming loudly) included in the first information. The verification unit 180 verifies whether or not there is matched situation information. In the example of the first information, there is no matched situation information.

In the example of the second information described above, the verification unit 180 refers to the normal situation storage unit 210 illustrated in FIG. 2. The verification unit 180 compares the set of the situation information (a person is holding something like a knife) associated with the environment information (kitchen) included in the first information with the situation information (a person is holding something like a knife) included in the first information. The verification unit 180 verifies whether or not there is matched situation information. In the example of the second information, there is matched situation information such as "a person is holding something like a knife".

The verified result output unit 190 outputs a result of the verification performed by the verification unit 180.

Figure 10:
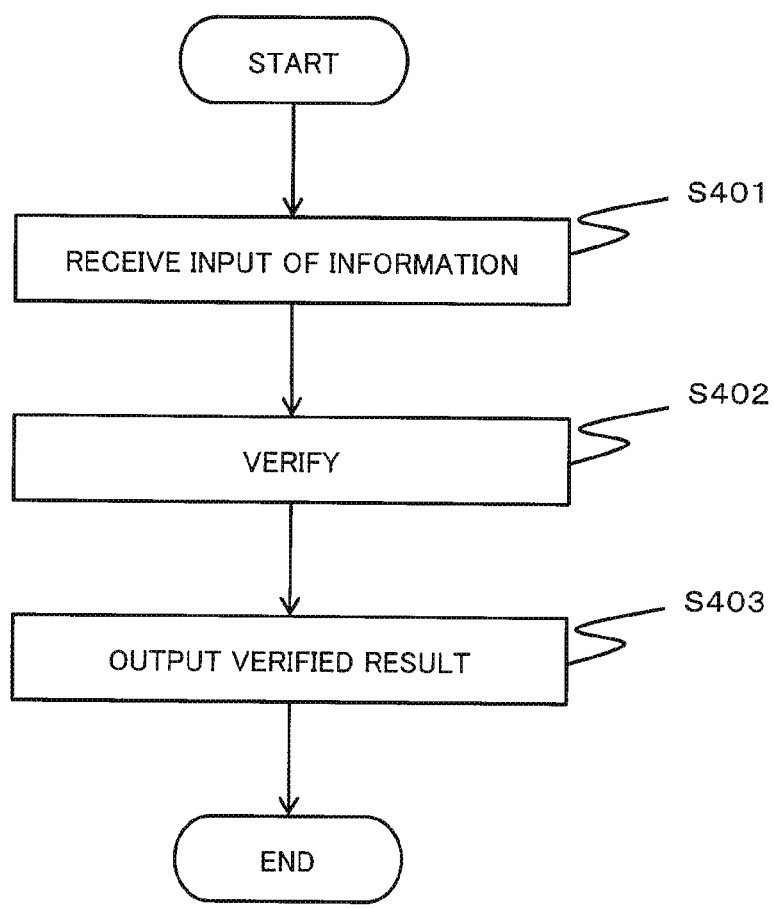
FIG. 10 is a flowchart illustrating an operation of the information processing system 1000 according to the fourth exemplary embodiment of the present invention.

Next, an operation of the information processing system 4000 illustrated in FIG. 9 will be described by using FIG. 10. FIG. 10 is a flowchart illustrating the operation of the information processing system 4000.

The third situation information receiving unit 170 receives an input of the information in which the situation information is associated with the environment information (S401). The verification unit 180 refers to the normal situation storage unit 210 to compare the set of the situation information associated with the environment information included in the information of which input is received with the situation information included in the information of which input is received. The verification unit 180 verifies whether or not there is situation information matched each other (S402). The verified result output unit 190 outputs the environment information retrieved by the verification unit 180 (S403).

The effect taken by the information processing system 4000 according to the fourth exemplary embodiment will be described.

The information processing system 4000 according to the fourth exemplary embodiment can determine whether or not the situation indicated by the situation information of which input is received is an abnormal situation in the environment indicated by the environment information of which input is received.

The operator can verify whether or not the monitoring rule that the operator intends to set is appropriate for monitoring a monitoring target environment by confirming the verified result output by the verified result output unit 190.

In the example described above, the operator can notice that it is inappropriate to describe the situation information such as "holding something like a knife" as the conditional clause of the monitoring rule for monitoring the kitchen.

In this way, the information processing system 4000 according to the fourth exemplary embodiment can support to verify as to whether or not a monitoring rule is appropriate.

While some aspects have been described hererinabove for implementing the present invention, the exemplary embodiments described above are intended to facilitate the understanding of the present invention and not intended to limit the present invention in its interpretation. The present invention may be modified and improved without departing from its spirits, and the equivalents thereof are included in the present invention.

The present application claims priority to Japanese Patent Application No. 2013-090536 filed on Apr. 23, 2013, and the entire disclosure of which is incorporated herein.

INDUSTRIAL APPLICABILITY

According to the present invention, setting or verification of a monitoring rule in response to a monitoring target environment can be supported.

REFERENCE SIGNS LIST

10 CPU
20 storage device
30 communication interface
40 input device
50 output device
60 drive device
70 storage medium
110 situation information receiving unit
120 retrieval unit
130 output unit
140 second situation information receiving unit
150 situation information extracting unit
160 expression expansion unit
170 third situation information receiving unit
180 verification unit
190 verified result output unit
210 normal situation storage unit
220 synonym storage unit
1000 information processing system
2000 information processing system
3000 information processing system
4000 information processing system

The invention claimed is:

1. An information processing system comprising:
a memory storing instructions; and
one or more processors configured to execute the instructions to:
store information indicating one or more normal motions of a moving body at each of a plurality of places or times;
receive an input of motion at a predetermined time;
determine, by comparing the inputted motion with a normal motion corresponds to the predetermined time based on the stored information, whether the inputted motion is a normal motion at the predetermined time; and
output information indicating the inputted motion is an abnormal motion if the inputted motion is not a normal motion.

2. The information processing system according to claim 1, wherein the stored information indicates a plurality of the normal motions by time.

3. The information processing system according to claim 1, wherein the one or more processors are further configured to execute the instructions to:
receive input data including information indicating a situation in a predetermined environment;
extract information related to motion at the predetermined time from the input data; and
receive, as the inputted motion, the extracted information.

4. The information processing system according to claim 3, wherein the input data is text data, image data, audio data or video data.

5. The information processing system according to claim 1, wherein the one or more processors are further configured to execute the instructions to:
receive an input of a plurality of motions at the predetermined time;
determine whether each of the plurality of motions is the normal motion; and
output information indicating whether each of the plurality of motions is the normal motion.

6. The information processing system according to claim 1, wherein the normal motion indicates a human action or motion of a vehicle.

7. An information processing method performed by one or more processors and comprising:
storing information indicating one or more normal motions of a moving body at each of a plurality of places or times;
receiving an input of motion at a predetermined time;
determining, by comparing the inputted motion with a normal motion corresponds to the predetermined time based on the stored information, whether the inputted motion is a normal motion at the predetermined time; and
outputting information indicating the inputted motion is an abnormal motion if the inputted motion is not a normal motion.

8. The information processing method according to claim 7, wherein the stored information indicates a plurality of the normal motions by time.

9. The information processing method according to claim 7, further comprising:
receiving input data including information indicating a situation in a predetermined environment;
extracting information related to motion at the predetermined time from the input data; and
receiving, as the inputted motion, the extracted information.

10. The information processing method according to claim 9, wherein the input data is text data, image data, audio data or video data.

11. The information processing method according to claim 7, further comprising:
receiving an input of a plurality of motions at the predetermined time;
determining whether each of the plurality of motions is the normal motion; and
outputting information indicating whether each of the plurality of motions is the normal motion.

12. The information processing method according to claim 7, wherein the normal motion indicates a human action or motion of a vehicle.

13. A non-transitory computer readable storage medium storing a program that causes a computer to execute processing comprising:
storing information indicating one or more normal motions of a moving body at each of a plurality of places or times;
receiving an input of motion at a predetermined time;
determining, by comparing the inputted motion with a normal motion corresponds to the predetermined time based on the stored information, whether the inputted motion is a normal motion at the predetermined time; and
outputting information indicating the inputted motion is an abnormal motion if the inputted motion is not a normal motion.

14. The non-transitory computer readable storage medium according to claim 13, wherein the stored information indicates a plurality of the normal motions by time.

15. The non-transitory computer readable storage medium according to claim 13, the processing further comprising:
receiving input data including information indicating a situation in a predetermined environment;
extracting information related to motion at the predetermined time from the input data; and
receiving, as the inputted motion, the extracted information.

16. The non-transitory computer readable storage medium according to claim 15, wherein the input data is text data, image data, audio data or video data.

17. The non-transitory computer readable storage medium according to claim 13, the processing further comprising:
receiving an input of a plurality of motions at the predetermined time;
determining whether each of the plurality of motions is the normal motion; and
outputting information indicating whether each of the plurality of motions is the normal motion.

18. The non-transitory computer readable storage medium according to claim 13, wherein the normal motion indicates a human action or motion of a vehicle.

* * * * *